Feb. 14, 1933.    J. S. STOKES    1,897,826
COMPOSITE BOX
Filed Sept. 9, 1931    2 Sheets-Sheet 1

INVENTOR.
BY John S. Stokes
Cornelius D. Ehret
his ATTORNEY.

Feb. 14, 1933.                  J. S. STOKES                  1,897,826
                               COMPOSITE BOX
                          Filed Sept. 9, 1931            2 Sheets-Sheet 2

INVENTOR.
John S. Stokes.
BY
Cornelius D. Ehret
his ATTORNEY.

Patented Feb. 14, 1933

1,897,826

UNITED STATES PATENT OFFICE

JOHN S. STOKES, OF HUNTINGDON VALLEY, PENNSYLVANIA, ASSIGNOR TO STOKES AND SMITH COMPANY, OF PHILADELPHIA, PENNSYLVANIA, A CORPORATION OF PENNSYLVANIA

COMPOSITE BOX

Application filed September 9, 1931. Serial No. 561,824.

My invention relates to boxes, containers, or the like, made of several components or elements of cardboard, or equivalent, held in position by applied sheet material.

Heretofore in boxes of this character, the side walls and box bottom have been of equal length, the edges of all, at each end of the box, terminating in the same vertical plane. The inside face of each box end engaged the corresponding end edges of the side walls and bottom, with the bottom edge of the box end substantially flush with the exterior surface of the box bottom.

In accordance with my invention, the box bottom and side walls are of unequal length; specifically the box bottom extends beyond the side walls with the bottom edge of the box end resting on the top face of the bottom extension and with the outer face of the box end in the same plane as the edge of the bottom extension. The end edges of the side walls engage the inner face of the box end. By this construction, the box ends preclude deformation or warping of the box bottom while at the same time the bottom extensions are effective in event of a blow to the box bottom, to prevent it from tearing away from the box ends, or from strip material holding it to the box ends.

My invention further resides in the features of construction and arrangement hereinafter described and claimed.

Figure 1:
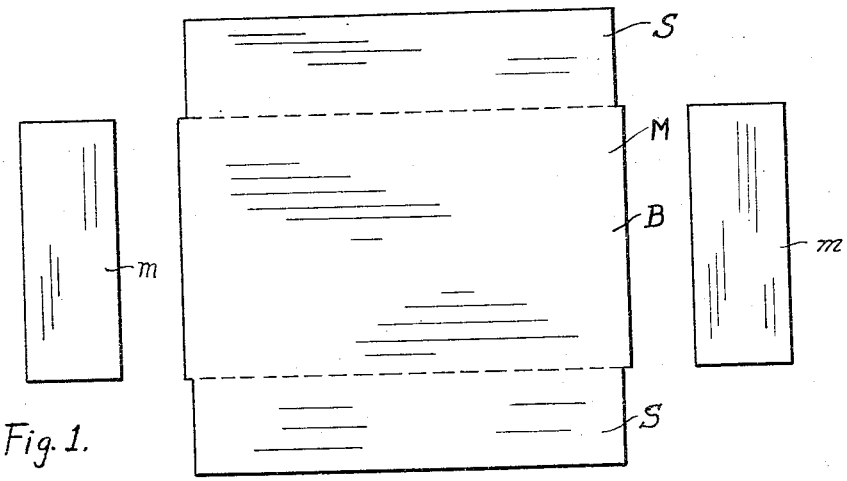

For an understanding of my invention and for illustration of some of the preferred forms thereof, reference is made to the accompanying drawings in which:

Fig. 1, in plan, discloses separate and unattached box components.

Figure 2:
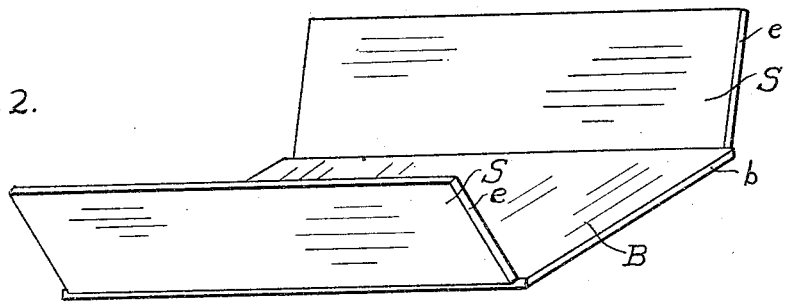

Fig. 2, in perspective, illustrates one of the components of Fig. 1, bent along scoring thereof.

Figure 3:
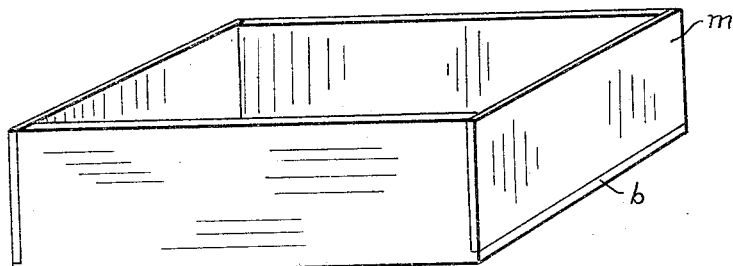

Fig. 3, in perspective, shows the box components of Fig. 1 in their box forming position.

Figure 4:
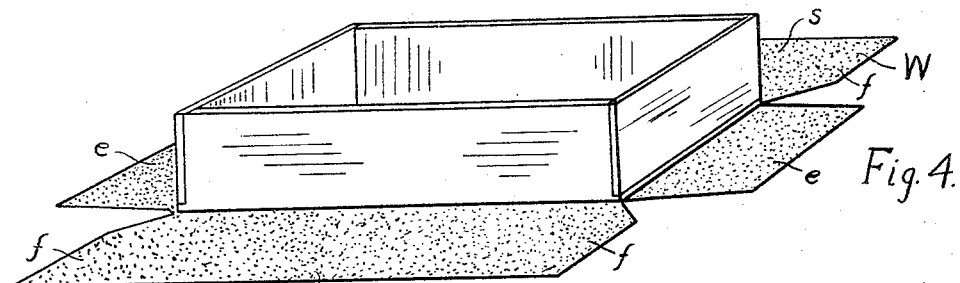

Fig. 4 in perspective illustrates the box assembly of Fig. 3, superimposed upon the wrapper.

Figure 5:
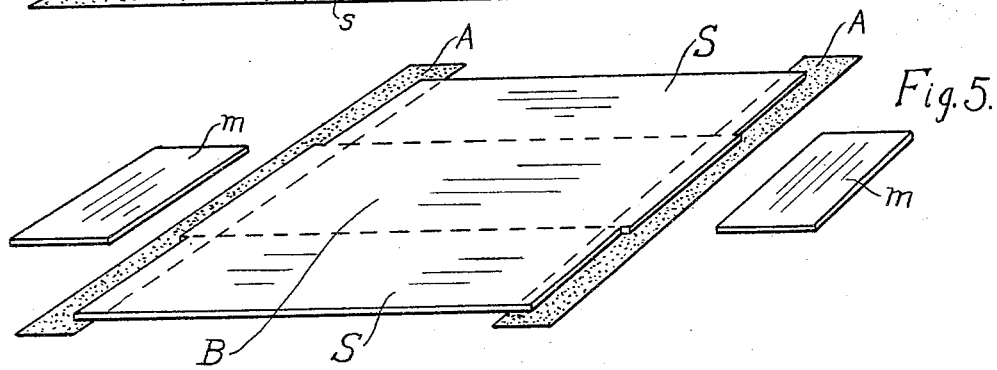

Fig. 5, in perspective, illustrates the box components of Fig. 1 with tabbing strips applied to the main component.

Figure 6:
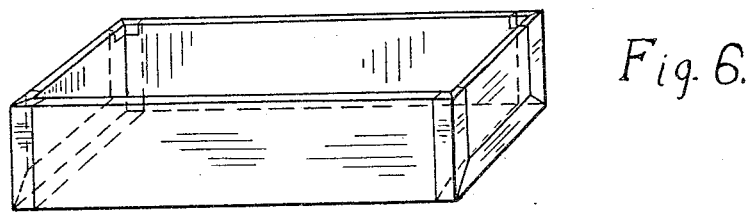
Figure 7:
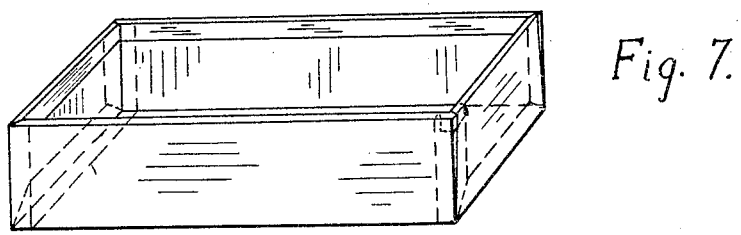

Figs. 6 and 7 illustrate in perspective different forms of the completed box.

Referring to Fig. 1, the major box component M, of cardboard, strawboard, or the like, may be of a single thickness of material, or laminated to obtain the desired thickness, in accordance with my application Serial No. 485,631, filed October 1, 1930. The bottom section B, as clearly shown, is of greater length than the side wall sections S, S, projecting at both ends of the box beyond the corresponding ends of the side walls to an extent substantially equal to the thickness of the minor components $m$, $m$ which are adapted to form the box ends. The minor components may be similar in material and thickness to the main component, or if desired may be of different material or thickness.

The main component M is preferably scored or creased on the under side so that the side walls S, S as shown in Fig. 2 may be bent upwardly and inwardly. With the side walls bent to position, the end edges $e$, $e$ of the side walls, and the end edge $b$ of the bottom section B do not lie in the same vertical plane as was ordinarily the case. The bottom section, as more clearly shown in Fig. 3 projects at each end of the box beyond the ends of the side walls to form a ledge upon which the bottom edge of an end component $m$ rests. The end edges of the side walls engage the inside faces of the minor components $m$.

If desired, adhesive may be applied to attach the box ends in position before the application of a wrapper, or tab strips as described and claimed in my application Serial No. 493,500, filed November 5, 1930.

In any event, the several components are preferably held in position by applied sheet material, as a wrapper, as broadly claimed in my Patent No. 1,796,630.

Specifically, the box assembly may be superimposed upon a wrapper W, Fig. 4, with the bottom section B of the box engaging the central section of the wrapper. The side panels $s$, and corner flaps $f$, and end panels $e$ are then folded in the usual manner to wrap the box, the completed box having generally the appearance shown in Fig. 7. The wrapper has not only the function of covering the box but also of uniting the several components in their box forming position. Since the box ends engage the upper face of the bottom section B of the main component across the entire width of the box, they effectively prevent any warping or deformation of the box bottom. Further, since the projecting part of the box bottom engages the bottom edge of the end sections, if a blow is delivered to the box bottom there is no tendency for it to pull away from the box end, or from wrapper holding it to the box end, as was the case with the previously known boxes of this type, in which the end edges *e* of the side walls and the end edge of the bottom section were all in the same vertical plane and all engaged the inner face of the box end.

While all the steps of assembling and wrapping the box may be performed manually, they are preferably performed by mechanism of the character disclosed in my Patent No. 1,796,731, and particularly copending applications Rider, 425,751, filed February 4, 1930; Rider, 460,859, filed June 13, 1930; and Rider et al, 490,400, filed October 22, 1930.

Suitable tabbing or re-enforcing strips may be applied to the wrapper W, if desired, to obtain additional strength, particularly at the box corners. The dotted lines in Fig. 7 indicate the position assumed by the tabbing of a wrapper.

Instead of holding the parts in position by a wrapper, or a tabbed wrapper, attaching strips of suitable material may be used alone. For example, strips A of suitable material as paper, cloth, or the like, may be applied to the opposite ends of the main component M, as shown in Fig. 5, with parts thereof projecting to substantial extent beyond the side wall and bottom sections. The minor components *m* and the major components M, are brought into box forming position as in Fig. 3 and thereafter the projecting parts of the attaching strips A are folded into engagement with the minor components *m* permanently to unite them in box forming position. The completed box is shown in Fig. 6. Preferably and as shown in Fig. 5, the strips A are of such length that they may, as appears in Fig. 6, be folded up over the top edge and down into the inside of the box further to strengthen the upper box corners. In this modification of my invention also, the projecting parts of the bottom section cooperate with the minor components *m* to prevent warping of the box bottom and greatly increase the resistance of the box to damage from blows to the box bottom.

Boxes constructed in accordance with my invention are of great strength and superior to those formed of one-piece blanks as well as those formed of three pieces in which the bottom edges of the end walls were substantially flush with the bottom or exterior surface of the box bottom.

For brevity in the appended claims, the term "cardboard" is generic and includes cardboard, strawboard, and materials of like character, other than wood, commonly used for box elements in the so-called paper box art.

What I claim is:

1. A three-piece box having a component, of cardboard, comprising a bottom element integral with side wall elements, said bottom element having extensions projecting beyond the ends of said side wall elements, separate end components against whose inner faces abut the ends of said side wall elements of said first named component, and whose lower edges abut against said bottom extensions of said first named component, and sheet material holding said end components to said first named component.

2. A three-piece box having a component, of cardboard, comprising a bottom element integral with side wall elements, said bottom element having extensions projecting beyond the ends of said side wall elements, separate end components against whose inner faces abut the ends of said side wall elements of said first named component, and whose lower edges abut against said bottom extensions of said first named component, and means for holding said end components to said first-named component comprising sheet material applied to the end components and across the ends of said extensions of said bottom element, and embracing the corners formed by said end components and said side wall elements.

3. A three-piece box having a component, of cardboard, comprising a bottom element integral with side wall elements, said bottom element having extensions projecting beyond said side wall elements, separate end components against whose inner faces abut the ends of said side wall elements of said first named component and whose lower edges abut against said bottom extensions of said first named component, and means for holding said end components to said first-named component comprising tab strips embracing the corners formed by said end components and said side wall elements, and sheet material applied to the faces of said end components and extending across the ends of said extensions and said bottom element.

4. A three-piece box having a component, of cardboard, comprising a bottom element integral with side wall elements, said bottom element having extensions projecting beyond the ends of said side wall elements, separate end components against whose inner faces abut the ends of said side wall elements of said first component and whose lower edges abut against said bottom extensions of said first named component, and means for holding said end components and said first named component to each other comprising a continuous tab strip embracing the corners at which the end components and said side components meet, and applied to the faces of said end components and extending across the ends of said extensions of said bottom element.

JOHN S. STOKES.